United States Patent
Ruckle et al.

(10) Patent No.: US 7,073,949 B2
(45) Date of Patent: Jul. 11, 2006

(54) DISK BLADE BEARING HUB ASSEMBLY

(75) Inventors: Jarrod Ray Ruckle, Bondurant, IA (US); Philip David Cox, Polk City, IA (US); James Franklin Bierl, West Des Moines, IA (US)

(73) Assignee: Deere & Company, Moline, IL (US)

( * ) Notice: Subject to any disclaimer, the term of this patent is extended or adjusted under 35 U.S.C. 154(b) by 474 days.

(21) Appl. No.: 10/437,756

(22) Filed: May 14, 2003

(65) Prior Publication Data

US 2004/0228557 A1 Nov. 18, 2004

(51) Int. Cl.
*F16C 33/76* (2006.01)

(52) U.S. Cl. .................... 384/460; 384/478; 384/486; 384/489; 172/394

(58) Field of Classification Search .............. 384/460, 384/478, 484, 485, 486, 488, 489, 589; 172/394, 172/518; 111/164
See application file for complete search history.

(56) References Cited

U.S. PATENT DOCUMENTS

| | | | | |
|---|---|---|---|---|
| 1,584,616 A | * | 5/1926 | Cothran | 384/460 |
| 2,652,291 A | * | 9/1953 | Magarian | 384/460 |
| 2,783,103 A | * | 2/1957 | Hamilton | 384/460 |
| 3,628,837 A | * | 12/1971 | Otto | 384/462 |
| 3,792,912 A | * | 2/1974 | Howe et al. | 384/482 |
| 3,932,006 A | * | 1/1976 | Tertinek et al. | 384/462 |
| 3,980,355 A | * | 9/1976 | Gilles | 384/460 |
| 4,699,526 A | * | 10/1987 | Sato | 384/486 |
| 5,267,619 A | | 12/1993 | Eversole | 172/572 |
| 5,785,129 A | | 7/1998 | Keller et al. | 172/536 |
| 6,158,523 A | | 12/2000 | Gengler et al. | 172/574 |

\* cited by examiner

*Primary Examiner*—William C Joyce

(57) ABSTRACT

A maintenance free repetitive sealing system for a disk blade bearing hub utilizing an integrated system of components to seal and protect the primary bearing seal. The blade side of the spindle includes a hub overlap portion which deflects dirt, keeps large debris out, and prevents wrapping. A plastic seal protector keeps dirt and debris from pushing directly into external seal lips of a multiple lip seal. The lip seal provides positive sealing and is backed up by a grease layer barrier. The hub overlap, plastic seal protector, and grease barrier protect the bearing seal. The back side of the bearing hub is positively sealed with a protected O-ring and dust cap combination. The cap combination also protects the blade mounting hardware threads and nut.

19 Claims, 3 Drawing Sheets

DISK BLADE BEARING HUB ASSEMBLY

FIELD OF THE INVENTION

The present invention relates generally to bearings for agricultural disk blades and, more specifically, to a disk blade bearing hub assembly having tapered roller bearings and multiple seals.

BACKGROUND OF THE INVENTION

Disk blade bearings for agricultural tillage and planting equipment are subjected to high loads in a severe environment. Bearing seal failure leading to premature bearing failure has been an ongoing problem. For years, the main attempt at a solution to the problem has been the utilization of a grease fitting with frequent scheduled greasing to flush contaminates out of the bearing. For most disk gang bearing applications, frequent greasing has been a generally acceptable practice since each bearing normally supports from three to six blades and the grease fittings are reasonably accessible. However, the frequent greasing is time-consuming and reduces the productivity of the implement.

Recently developed combination tillage tools have employed individually mounted bearing blade assemblies, and machines with individually mounted blades are able to run in wetter fall soil conditions. The individually mounted blades create two new problems relative to the grease method of flushing the bearings. First, wetter field conditions are harder on the seals. Mud packs into the seal area and ultimately works into the bearing to cause permanent damage to the seals. To overcome the mud problem, the frequency of required re-greasing to flush the contaminates and prevent bearing failure has to be increased. In addition, the individually mounted blade bearing assemblies result in more bearings to carry the same number of blades as a disk gang. The combination of more grease fittings to grease and an increased maintenance frequency results in a difficult, time-consuming maintenance chore.

Disk mounted bearings require a dust cap on the disk hub which hampers blade scouring and the taper roller bearings must be carefully torqued during the assembly process. The taper roller bearings also act like a pump to force grease out of the raceway and through the seal. The single seal often fails to adequately protect the bearings from contamination by dirt and debris.

SUMMARY OF THE INVENTION

It is therefore an object of the present invention to provide an improved disk blade bearing hub assembly. It is a further object to provide such an assembly which overcomes one or more of the aforementioned problems.

It is another object of the present invention to provide an improved disk blade bearing hub assembly which is simple, economical and compact in construction and which reduces maintenance compared to at least most previously available assemblies. It is yet another object to provide such an assembly which has unique repetitive sealing system for protecting the primary bearing seal.

It is a further object of the invention to provide an improved disk blade bearing hub assembly particularly useful for individually mounted bearing blade assemblies. It is another object to provide such an assembly which is able to withstand extended adverse operations, including operation in wet fall soil without deterioration of the primary seal or the disk blade bearing.

It is a further object to provide an improved single disk blade bearing hub assembly which is substantially narrower than at least most previously available single disk blade hub assemblies for improved trash and soil flow. It is another object to provide such an assembly which facilitates close side-by-side disk blade mounting near the center of a machine adjacent the intersection of gang tube halves. It is another object to provide such an assembly providing better disk scouring than at least most previously available single disk hub assemblies.

A maintenance free repetitive sealing system for a disk blade bearing hub utilizes an integrated system of components to seal and protect the primary bearing seal. The blade side of the spindle includes a hub overlap portion which deflects dirt, keeps large debris out, and prevents wrapping. A plastic seal protector keeps dirt and debris from pushing directly into external seal lips of a multiple lip seal. The lip seal provides positive sealing and is backed up by a grease layer barrier. The hub overlap, plastic seal protector, multiple lip seal and grease barrier protect the bearing seal. The back side of the bearing hub is positively sealed with a protected O-ring and dust cap combination. The cap combination also protects the blade mounting hardware threads and nut. The width of the hub assembly is only about three-fourths that of assemblies utilizing a more conventional arbor bolt and double nut construction.

The location of the dust cap on the back side of the housing eliminates a bulky protrusion at the center of the disk blade so the blade scours more easily. In addition, the cap is recessed within the housing and does not protrude. The bearing is sealed, does not require re-greasing, and does not require torquing to set bearing end play. The bearing seal counteracts normal tapered roller pumping action and keeps the grease in front of the bearing rollers. A low cost, standard grade bolt can be utilized to extend through the spindle and clamp the blade against the outer end of the spindle.

These and other objects, features and advantages of the present invention will become apparent from the detailed description below in view of the drawings.

DESCRIPTION OF THE PREFERRED EMBODIMENT

Figure 1:
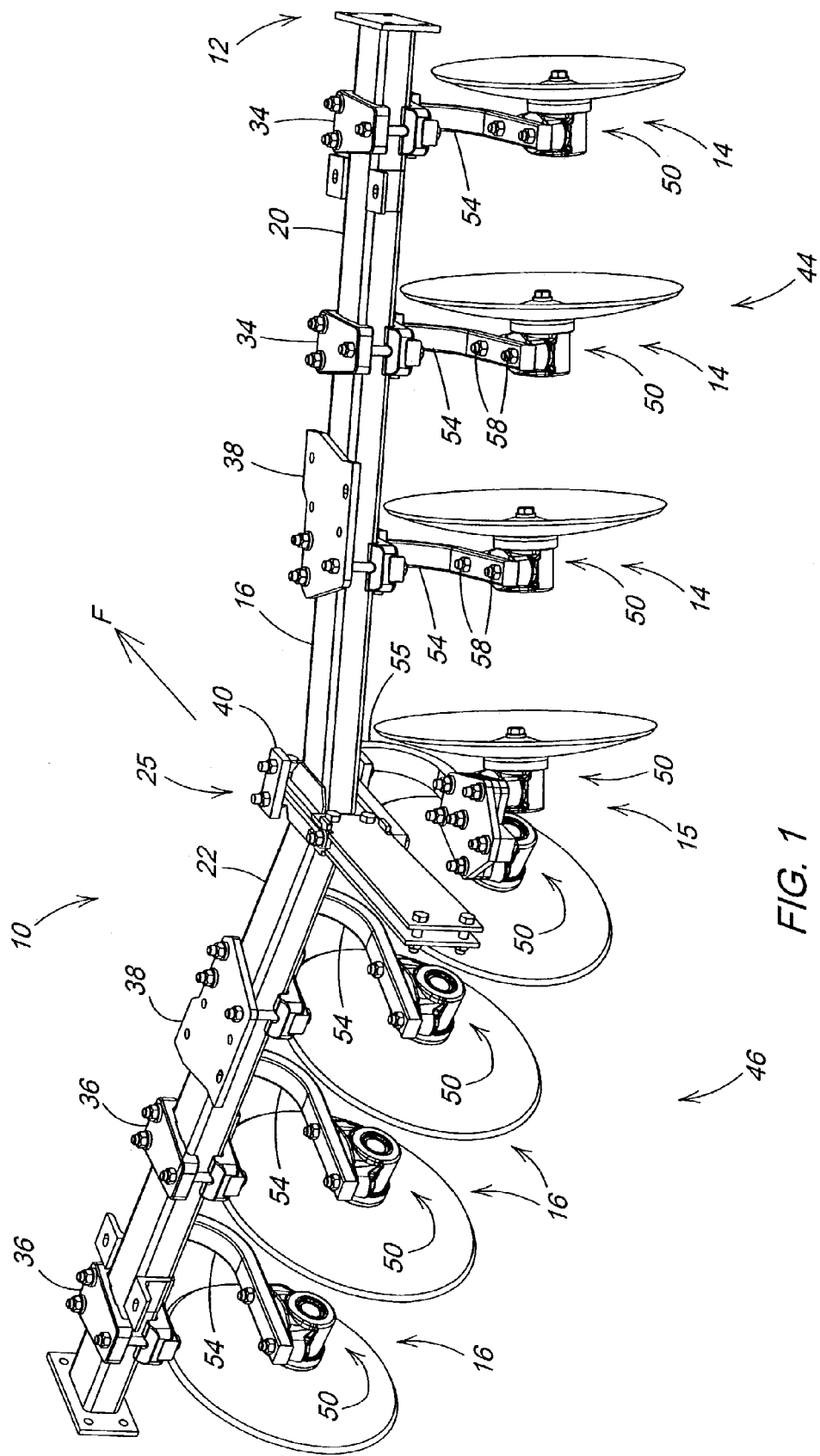
FIG. 1 is a perspective view of a portion of an agricultural implement having disk blade assemblies supported from converging gang tubes.

Referring to FIG. 1, therein is shown a portion of an agricultural tillage implement 10 such as a mulch ripper or other implement having a frame 12 supporting disk blade assemblies indicated generally at 14, 15 and 16. The implement frame 12 includes angled gang tubes 20 and 22 forming opposite halves centrally connected by gang tube plate bracket structure 25. Standard bracket structures 36, 38 and 40 connect the disk blade assemblies 14, 15 and 16 to the tubes 20 and 22 to generally define disk gangs 44 and 46 angled with respect to a direction transverse to the forward direction (F).

Figure 2:
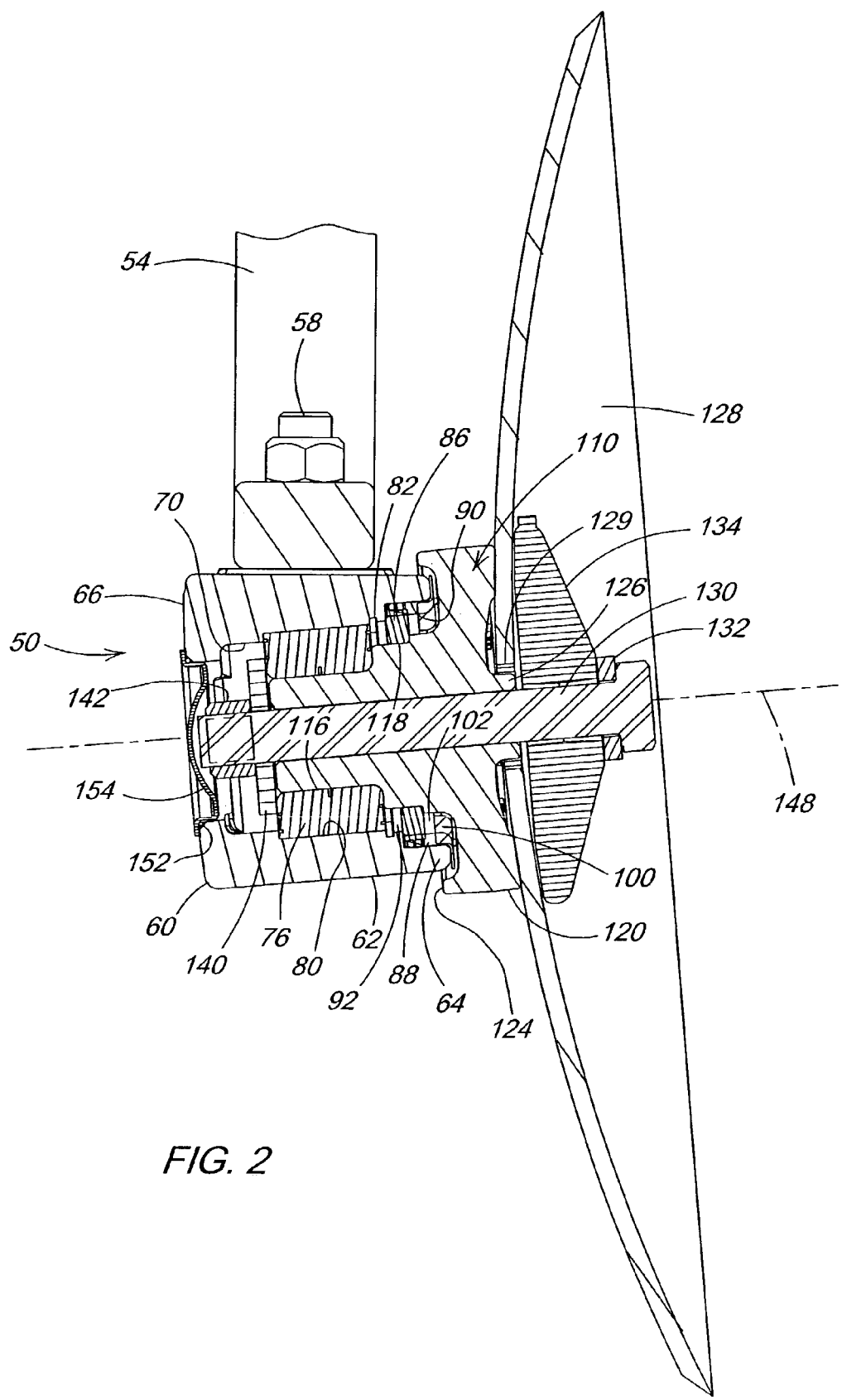
FIG. 2 is an enlarged sectional view of one of the disk blade assemblies shown in FIG. 1.
Figure 3:
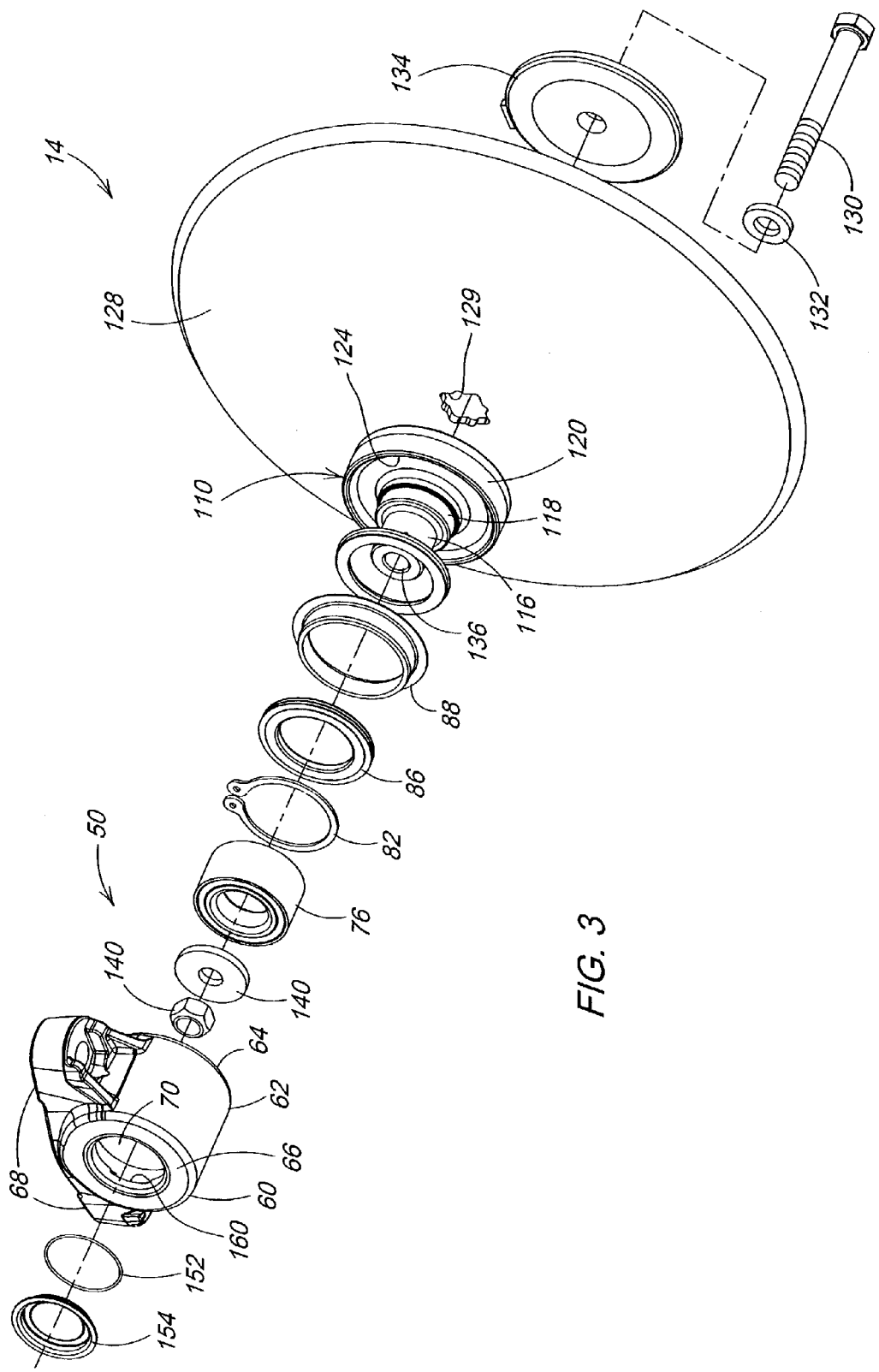
FIG. 3 is an exploded view of the disk blade assembly of FIG. 2.

The disk blade assemblies 14, 15 and 16 are shown with identical disk bearing hub assemblies 50 (FIGS. 2 and 3). The hub assemblies 50 are connected to the lower tool-receiving ends of curved shanks or C-springs 54 and 55 in either concave right (assemblies 14) or concave left (assemblies 16) configuration. The hub assemblies 50 are reversible on the C-springs, and therefore a single hub configuration may be utilized for all the assemblies 14, 15 and 16. The hub assembly for the blade assemblies 14 will be described in detail below, and it is to be understood that the hub configuration for the remaining assemblies 15 and 16 is generally identical. The assembly 15 with double disk configuration is shown and described more fully in copending and commonly assigned U.S. application Ser. No. 437,754, now U.S. Pat. No. 6,913,085, filed concurrently herewith and entitled Single Standard Double Disk Configuration. Although shown with cushion standards, the assemblies can also be utilized with rigid standards.

The uppermost end of the C-spring 54 is connected to the tube 20 by the clamp 34 (FIG. 1) in generally a fore-and-aft configuration with the C-spring opening in the rearward direction. The lower tool-receiving end of the C-spring approaches a horizontal orientation directly below the clamp 34 and is apertured at fore-and-aft spaced locations to receive a pair of mounting bolts 58 which connect the hub assembly 50 to the C-spring.

The hub assembly 50 includes a main housing 60 having a generally cylindrically shaped outer surface 62 with a first or blade-side end 64 and a second or innermost end 66. The upper portion of the main housing 60 includes forward and aft projecting apertured lugs 68 symmetrically arranged relative to the housing for receiving the mounting bolts 58 which secure the housing to the underside of the tool-receiving end of the C-spring 54.

The housing 60 includes a central stepped bore 70 extending from the first side 64 through to the second side 66. The bore is machined with the diameter of each section of the bore decreasing in diameter from the side 64 to the side 66. A factory sealed and preset double row tapered roller bearing 76, such as a Timken® UNIPAC™ bearing, is seated in a central machined section 80 of the bore 70 and secured therein by a snap ring 82 (FIG. 2). A seal such as a triple lip seal 86 and a seal cup 88 are located in a machined outer bore section 90. The seal 86 is offset axially outwardly of the outermost extremity of the tapered roller bearing 76 to define a grease-receiving cavity or area 92 adjacent the step between the sections 80 and 90 which provides an intermediate grease layer barrier reducing contaminants reaching the bearing 76. An annular plastic or Teflon® seal protector 100 is located at the opening in the side 64. An outer grease cavity or area 102 is defined between the seal protector and the seal 86.

A forged alloy steel spindle 110 having a stepped cylindrical surface extending into the bore 70 includes a machined innermost section 116 extending through the inner race of the bearing 76. The circumference of the spindle 110 increases at section 118 to extend radially outwardly around the outer end of the bearing 76 adjacent the snap ring 82 and supports the body or base of the seal 86. An outer section 120, having a diameter slightly greater than that of the section 118, extends to the end of the bore 70 in contact with the seal protector 100.

An enlarged outermost end of the spindle 110 includes a housing overlap portion 120 projecting radially outwardly of the first side 64 of the housing 60. The overlap portion includes a protective lip 124 extending in the axial direction towards the inner end of the spindle 110 at a location adjacent the outer surface 62 of the first side of the housing. A blade-receiving non-circular projection 126 projects axially outwardly from a central portion of the outermost end of the spindle 110 to support a conventional concave outwardly disk blade 128 via mating aperture 129.

A standard grade 8 bolt 130 extends through a washer 132, a blade clamp casting 134 and a central bore 136 in the spindle 110. The threaded end of the bolt 130 projects axially through the bore 136 beyond the innermost end of the bearing 76 but is protectively maintained within the bore 70 of the housing 62. A washer 140 is inserted over the threaded end and a nut 142 is threaded onto the bolt to urge the washer against the end of the spindle 110 and against the inner race of the bearing 76. The headed end of the bolt 130 draws the blade clamp casting 134 against the blade 128 to sandwich the blade between the casting and the outermost end of the spindle 110. The bolt 130, blade 128, spindle 110 and inner race of the bearing 76 are constrained to rotate together about a disk blade axis 148.

The bearing 76 supports the spindle 110 and blade 128 for rotation about the axis 148. The lip 124 of the hub overlap portion deflects dirt and debris away from the seal protector 100 and prevents wrapping by stringy material such as vines and twine. The seal protector 100 keeps dirt and debris from pushing directly into external seal lips of the multiple lip seal 86. A layer of grease in the cavity 102 provides another barrier protecting the seal 86 from dirt and debris. The lip seal 86 provides positive sealing and is backed up by a grease layer barrier in the cavity 92. The hub overlap, plastic seal protector, multiple lip seal and grease barriers protect the seal of the bearing 76. The above-described bearing structure with protective arrangement has been shown to increase average bearing life many times over that of conventional disk bearing structures.

The back side of the bearing hub is also positively sealed using an O-ring 152 and dust cap 154. As best seen in FIG. 2, the cap 154 is recessed within the innermost end 66 of the housing 62 and protects the threads of the bolt 130 and the nut 142. The structure eliminates a large dust cap on the blade side of the assembly that would otherwise hinder scouring of the blade 128. The overall width of the bearing assembly is reduced to facilitate close side-by-side disk blade mounting near the center of a machine adjacent the intersection of gang tube halves as shown at 15 in FIG. 1.

To facilitate easy removal of the bearing 76 from the housing 62, the bore 70 includes inner ledge structure 160 near the innermost end 66 for facilitating support of a bearing removal tool within the housing. A screw-threaded insert (not shown) may be positioned against the ledge structure 160 and a bolt threaded into the bore 70. The bolt will contact and force the spindle 110 outwardly as the bolt is threaded into the bore. Thereafter, the procedure is repeated with an enlarged end placed on the bolt which contacts and forces the bearing 76 outwardly.

Having described the preferred embodiment, it will become apparent that various modifications can be made without departing from the scope of the invention as defined in the accompanying claims.

We claim:

1. A disk bearing hub assembly comprising:
   a housing with an outer surface, first and second sides, and
      a bore extending between the sides;
   a bearing assembly supported within the bore;
   a spindle having an inner end supported by the roller
      bearing assembly within the bore for rotation about a
      spindle axis, and an outer end extending axially outwardly of the first side of the housing;
   the outer end of the spindle including a housing overlap
      portion projecting radially outwardly of the first side of
      the housing, the overlap portion including a protective lip extending in the axial direction towards the inner end of the spindle at a location adjacent the outer surface of the first side of the housing;

a first seal located within the bore adjacent the first side of the housing and the overlap portion, the first seal limiting movement of dirt and debris passing the protective lip toward the bearing assembly;

a multiple lip seal sealing between the housing and the spindle, the lip seal located axially inwardly from the first seal and axially outwardly of the bearing assembly, the lip seal limiting movement of dirt and debris passing the first seal toward the bearing assembly;

the spindle including a disk support area extending axially outwardly of the first side of the housing; and wherein the inner end of the spindle is completely contained within the bore of the housing, and the second side of the housing is sealed to prevent dirt and debris from entering the bearing assembly from the second side.

2. The assembly as set forth in claim 1 including a first grease-receiving area located between the first seal and the lip seal, and a second grease-receiving area located between the lip seal and the roller bearing assembly.

3. The assembly as set forth in claim 1 wherein the spindle includes a spindle bore receiving a disk mounting bolt therethrough having a mounting end for receiving a disk and an inner end terminating within the bore of the housing, the inner end sealed within the housing.

4. The assembly as set forth in claim a 1 wherein the housing bore extends completely through the housing, and further including a sealing cap for sealing the housing bore at the second side of the housing.

5. The assembly as set forth in claim 1 wherein the bore of the housing includes a central stepped portion and the bearing assembly is seated on the central stepped portion.

6. The assembly as set forth in claim 4 wherein the spindle supports a disk mounting bolt having a threaded nut supported within the sealed housing bore.

7. A disk bearing hub assembly comprising:

a housing with an outer surface, first and second sides, and a bore extending between the sides;

a bearing assembly supported within the bore;

a spindle having an inner end supported by the bearing assembly within the bore for rotation about a spindle axis, and an outer end extending axially outwardly of the first side of the housing;

the outer end of the spindle including a housing overlap portion projecting radially outwardly of the first side of the housing, the overlap portion including a protective lip extending in the axial direction towards the inner end of the spindle at a location adjacent the outer surface of the first side of the housing;

a first seal located within the bore adjacent the first side of the housing and the overlap portion, the first seal limiting movement of dirt and debris passing the protective lip toward the bearing assembly;

a multiple lip seal including radially projecting lips sealing between the housing and the spindle, the lip seal located axially inwardly from the first seal and axially outwardly of the bearing assembly, the lip seal limiting movement of dirt and debris passing the first seal toward the bearing assembly;

the spindle including a disk support area extending axially outwardly of the first side of the housing; and including a bearing assembly securing ring located axially outwardly of the bearing assembly and a contaminant barrier located axially outwardly of the ring between the lip seal and the bearing assembly.

8. The assembly as set forth in claim 7 wherein the contaminant barrier comprises a first grease-receiving area between the bearing assembly and the lip seal.

9. The assembly as set forth in claim 8 wherein a second grease-receiving area is defined between the first seal and the lip seal.

10. A disk bearing hub assembly comprising:

a housing with an outer surface, first and second sides, and a bore extending between the sides;

a tapered roller bearing assembly supported within the bore;

a spindle having an inner end supported by the roller bearing assembly within the bore for rotation about a spindle axis, and an outer end extending axially outwardly of the first side of the housing;

a first seal located within the bore adjacent the first side of the housing, the first seal limiting movement of dirt and debris toward the tapered roller bearing assembly;

a multiple lip seal sealing between the housing and the spindle, the lip seal located axially inwardly from the first seal and axially outwardly of the tapered roller bearing assembly, the lip seal limiting movement of dirt and debris passing the first seal toward the tapered roller bearing assembly;

a first grease-receiving area located between the first seal and the lip seal, and a second grease receiving area located between the lip seal and the roller bearing assembly; and the spindle including a disk support area extending axially outwardly of the first side of the housing; and wherein the inner end of the spindle is completely contained within the bore of the housing, and wherein the second side of the housing is sealed to prevent dirt and debris from entering the bearing assembly from the second side.

11. The assembly as set forth in claim 10 including a bearing assembly snap ring located between the lip seal and the roller bearing assembly.

12. The assembly as set forth in claim 11 including a second grease-receiving area located between the snap ring and the lip seal.

13. The assembly as set forth in claim 10 wherein the spindle includes a spindle bore receiving a disk mounting bolt therethrough having a mounting end for receiving a disk and an inner end terminating within the bore of the housing, the inner end sealed within the housing.

14. The assembly as set forth in claim 10 wherein the housing bore extends completely through the housing, and further including a sealing cap for sealing the housing bore at the second side of the housing and ledge structure located within the bore for facilitating support of a bearing removal tool within the housing.

15. The assembly as set forth in claim 10 wherein the outer end of the spindle includes a housing overlap portion projecting radially outwardly of the first side of the housing, the overlap portion including a protective lip extending in the axial direction towards the inner end of the spindle at a location adjacent the outer surface of the first side of the housing to limit movement of dirt and debris towards the first seal.

16. A repetitive sealing system for a disk blade bearing hub, comprising:

a housing having a stepped bore with first, second and third stepped surfaces;

a bearing assembly supported within the housing in the first stepped surface;

a disk-supporting spindle mounted for rotation about a spindle axis relative to the housing by the bearing assembly and having an axially projecting end for receiving a disk blade;

a lip seal including radially projecting lips sealing between the second stepped surface of the housing and the spindle, the lip seal located in the housing between the bearing assembly and the projecting end, the lip seal providing primary sealing protection for the bearing assembly;

a seal protector located in the third stepped surface between the lip seal and the projecting end for limiting movement of dirt and debris towards the lip seal;

a grease-receiving area located between the lip seal and the seal protector adjacent the third stepped surface axially offset from the first stepped surface for receiving lubricant and also limiting movement of dirt and debris towards the lip seal; and wherein the spindle includes an overlap portion partially wrapping around the housing adjacent the axially projecting end to deflect dirt and debris away from the seal protector.

17. The sealing system as set forth in claim 16 wherein the housing has an open side through which the projecting end of the spindle extends, and a closed side, and wherein the bearing assembly includes an axially innermost side sealed within the closed side and an outermost side sealed by the lip seal.

18. A repetitive sealing system for a disk blade bearing hub, comprising:

a housing;

a bearing assembly supported within the housing;

a disk-supporting spindle mounted for rotation about a spindle axis relative to the housing by the bearing assembly and having an axially projecting end for receiving a disk blade;

a lip seal connected sealing between the housing and the spindle, the lip seal located in the housing between the bearing assembly and the protecting end, the lip seal providing primary sealing protection for the bearing assembly;

a seal protector located between the lip seal and the projecting end for limiting movement of dirt and debris towards the lip seal;

a grease-receiving area located between the lip seal and the seal protector for receiving lubricant and also limiting movement of dirt and debris towards the lip seal;

wherein the spindle includes an overlap portion partially wrapping around the housing adjacent the axially projecting end to deflect dirt and debris away from the seal protector;

wherein the housing has an open side through which the projecting end of the spindle extends, and a closed side, and wherein the bearing assembly includes an axially innermost side sealed within the closed side and an outermost side sealed by the lip seal; and wherein the spindle includes a bore receiving a disk mounting bolt, the disk mounting bolt including a threaded end projecting through the bearing assembly towards the closed side, the threaded end terminating within the housing and wherein the closed side of the housing protects the threaded end.

19. The sealing system as set forth in claim 18 further including a removable cap sealing the closed side and providing access to the threaded end.

* * * * *